United States Patent [19]

Itaki

[11] Patent Number: 5,532,764
[45] Date of Patent: Jul. 2, 1996

[54] CONVERGENCE ERROR DETECTING APPARATUS CAPABLE OF BEING APPLIED TO PROJECTION-TYPE DISPLAYS HAVING DIFFERENT SCANNING FREQUENCIES

[75] Inventor: Yohichi Itaki, Tokyo, Japan

[73] Assignee: NEC Corporation, Japan

[21] Appl. No.: 213,910

[22] Filed: Mar. 15, 1994

[30] Foreign Application Priority Data

Mar. 16, 1993 [JP] Japan ................................... 5-055298

[51] Int. Cl.$^6$ ............................. H04N 9/28; H04N 3/227
[52] U.S. Cl. ........................................ 348/745; 348/807
[58] Field of Search ................................. 348/744, 745, 348/747, 806, 807; 315/368.12, 368.13; H04N 9/28, 9/31, 3/223, 3/227

[56] References Cited

FOREIGN PATENT DOCUMENTS 56-169984 12/1981 Japan ................................ H04N 9/28
63-272294 11/1988 Japan ................................ H04N 9/28
4-68688 3/1992 Japan ................................ H04N 9/28

Primary Examiner—Safet Metjahic
Assistant Examiner—Cheryl Cohen
Attorney, Agent, or Firm—Ostrolenk, Faber, Gerb & Soffen

[57] ABSTRACT

In a convergence error detecting apparatus for use in combination with a display system of a projection type which displays, onto a display panel, a projected image signal which has a first synchronization signal of a predetermined frequency, and for detecting a convergence error signal representative of a convergence error appearing on the projected image signal, image pickup device is operated by a second synchronization signal of a frequency different from the predetermined frequency, for picking up the projected image signal to produce a pickup image signal by the use of the second synchronization signal, and processing unit processes the pickup image signal to detect the convergence error and to produce a convergence error signal representative of the convergence error. The convergence error signal is supplied to the display system to remove the convergence error in the display system.

16 Claims, 12 Drawing Sheets

DYNAMIC TILT

DYNAMIC V BOW

DYNAMIC V KEYSTONE

DYNAMIC V LINEAR

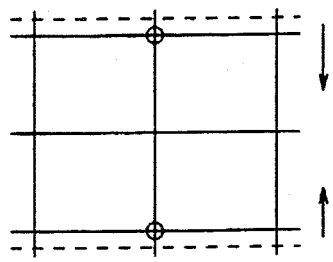
FIG. 13 (F) DYNAMIC HEIGHT
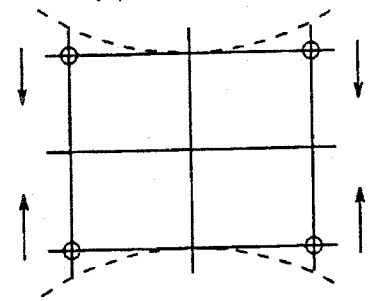
FIG. 13 (G) DYNAMIC TOP/BOTTOM PINCUSHION
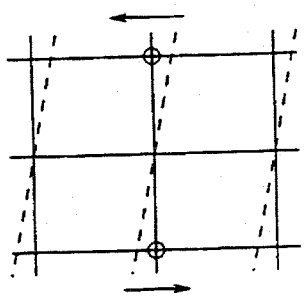
FIG. 13 (H) DYNAMIC SKEW
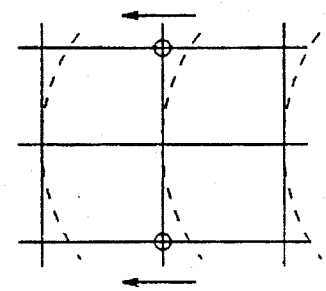
FIG. 13 (I) DYNAMIC H BOW

DYNAMIC H KEYSTONE

DYNAMIC H LINEAR

DYNAMIC WIDTH

DYNAMIC SIDE PINCUSHION

V KEYSTONE BALANCE

H KEYSTONE BALANCE

TOP/BOTTOM PINCUSHION BALANCE

SIDE PINCUSHION BALANCE

CONVERGENCE ERROR DETECTING APPARATUS CAPABLE OF BEING APPLIED TO PROJECTION-TYPE DISPLAYS HAVING DIFFERENT SCANNING FREQUENCIES

BACKGROUND OF THE INVENTION

This invention relates to a convergence error detecting apparatus for use in a projection-type display system.

Conventionally, such a convergence error is monitored by an observer and compensated by a digital convergence adjusting unit contained in the projection-type display system.

In order to correctly carry out the detection and the compensation of the convergence error, convergence error detecting apparatus have recently been proposed which automatically detect the convergence error and transmit the convergence error information to the digital convergence adjusting unit.

Such convergence error detecting apparatus of the type described are disclosed in Unexamined Japanese Patent Publications No. Shō 56-169984, namely, 169984/1981 and No. Shō 63-272294, namely, 272294/1988.

In the convergence error detecting apparatus mentioned in the referenced patent publications, a convergence adjusting pattern is projected as a projected image on a display panel and is detected as a pickup image by a television or a video camera to calculate convergence error information by monitoring a displacement of the convergence adjusting pattern from reference positions.

However, synchronization should be kept between the projected image and the pickup image. In other words, the television or the video camera must be driven by a synchronization signal which is synchronized with that of the projected image of the projection-type display system. Otherwise, an undesirable brightness variation inevitably appears in the form of a belt-shaped portion locally on the pickup image and is moved vertically on the pickup image. Such appearance of a belt-shaped portion makes it difficult to apply the convergence error detecting apparatus to a projection-type display system which is operable in accordance with scanning frequencies different from those of the television or the video camera. In other words, no consideration is made about a convergence error detecting apparatus which is operable in response to the scanning frequency different from that of the projection-type display systems. If the convergence error detecting apparatus can be driven by a synchronization frequency different from that of the projected image, such a convergence error detecting apparatus can be applied to a wide variety of television signals.

SUMMARY OF THE INVENTION

It is therefore an object of this invention to provide a convergence error detecting apparatus which can be applied to a wide variety of projection-type display systems or television signals.

It is another object of this invention to provide a convergence error detecting apparatus of the type described which is compact in size.

It is still another object of this invention to provide a convergence error detecting apparatus of the type described, which is operable by a synchronization frequency different from that of a projected image signal.

On describing the gist of the present invention, it is possible to understand that a convergence error detecting apparatus is for use in combination with a display system of a projection type which displays, onto a display panel, a projected image signal which has a first synchronization signal of a predetermined frequency, and that the apparatus is for detecting a convergence error signal representative of a convergence error appearing on the projected image signal.

According to this invention, the above-understood apparatus comprises: image pickup means operated by a second synchronization signal of a frequency different from the predetermined frequency, for picking up the projected image signal to produce a pickup image signal by the use of the second synchronization signal; processing means for processing the pickup image signal to detect the convergence error and to produce a convergence error signal representative of the convergence error; and means for supplying the convergence error signal to the display system to remove the convergence error in the display system.

DESCRIPTION OF THE PREFERRED EMBODIMENTS

Referring to FIGS. 1 to 10, a convergence error detecting apparatus 20 according to a first embodiment of the present invention is for use in combination with a projection-type display apparatus 10 to form an image processing system.

Figure 1:
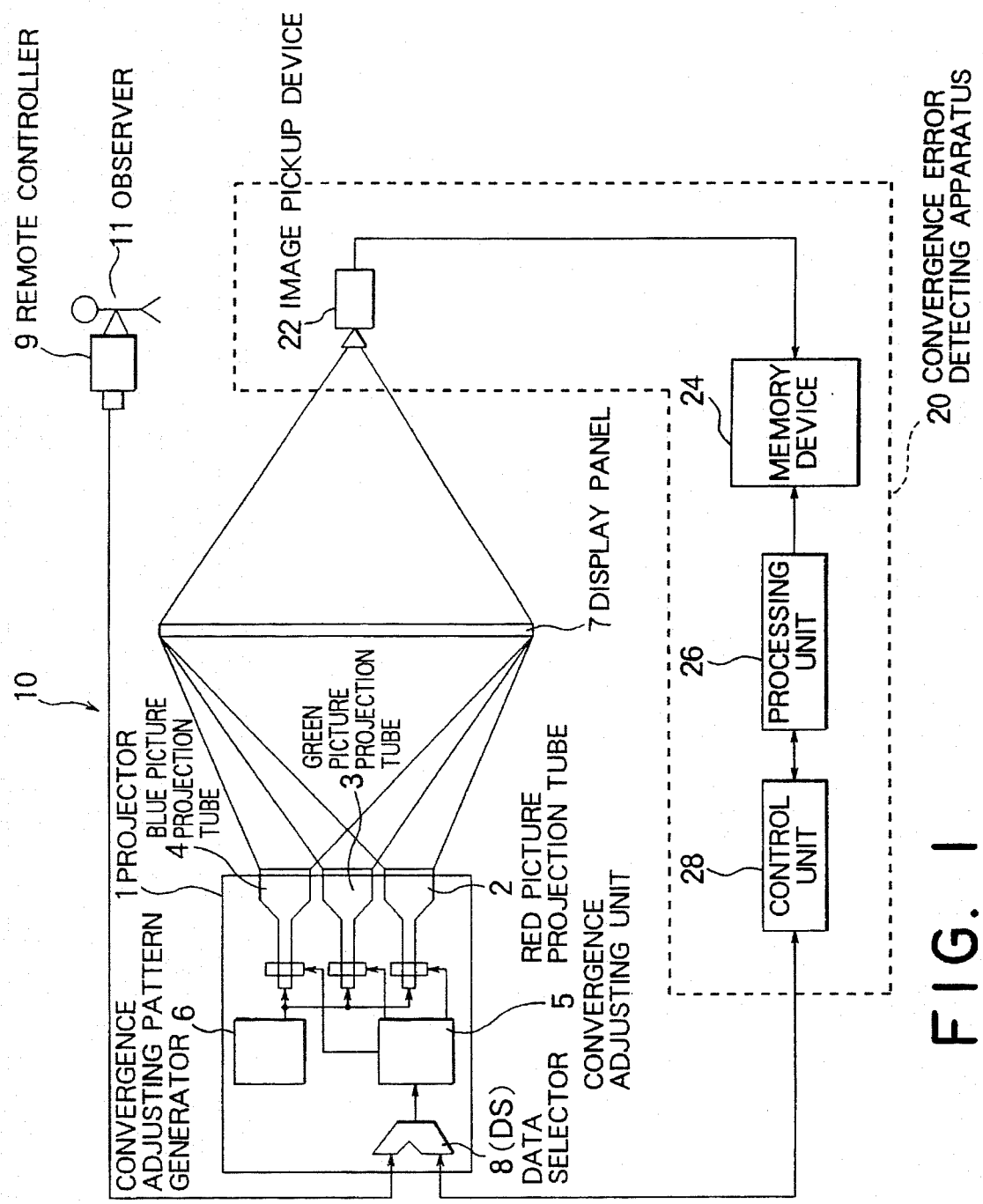
FIG. 1 shows a block diagram for explaining a convergence error detecting apparatus according to a first embodiment of this invention.

In FIG. 1, the projection-type display apparatus 10 comprises a projector 1 connected to the convergence error detecting apparatus 20 and a display panel or screen 7 on which an image is projected from the projector 1. The image on the display panel 7 is monitored by an observer 11 who is possessed of a remote controller 9 for controlling convergence of the image.

As illustrated in FIG. 1, the projector 1 includes a red picture projection tube (will be called an R-projector) 2, a green picture projection tube (simply called a G-projector) 3, a blue picture projection tube (called a B-projector) 4, a convergence adjusting unit 5, a convergence adjusting pattern generator 6, and a data selector (DS) 8.

In the projection-type display apparatus 10, each projected point is adjusted to coincide with each other by inputting a convergence error signal into the convergence adjusting unit 5 in a known manner. For example, let the observer 11 operate the remote controller 9 to produce a convergence error signal. In this event, the convergence error signal is transmitted from the remote controller 9 into the convergence adjusting unit 5 through the data selector (DS) 8.

The convergence error detecting apparatus 20 comprises an image pickup device 22, such as charge coupled device (CCD) video camera (illustrated in FIG. 2), for picking up a projected image, namely, a plurality of projected points of a convergence adjusting pattern 40 projected onto the display panel 7 to produce an output detection signal, a memory device 24, such as an image memory (illustrated in FIG. 2), for memorizing the output detection signal as a memorized detection signal. Such an output detection signal is representative of the image picked up by the image pickup device 22 and may be called a pickup image signal. The convergence error detecting apparatus further comprises a processing unit 26 for processing convergence error signals by reading the memorized detection signal, a controlling unit 28 for controlling the projection-type display apparatus 10 by transmitting the convergence error signals to the convergence adjusting unit 5.

In the convergence error detecting apparatus 20, the image pickup device 22 is positioned in the front of the display panel 7 to pick up a whole area of the convergence adjusting pattern 40 projected onto the display panel 7 and is driven by a synchronization signal which is not synchronized with an image signal of the projection-type display system. This shows that, when the projected image signal includes a first synchronization signal of a predetermined frequency, the pickup image signal includes a second synchronization signal of a frequency different from the predetermined frequency.

In this embodiment, the processing unit 26 and the controlling unit 28 both of which are illustrated in FIG. 1 are represented by a central processing unit (CPU) included in a personal computer 36. The personal computer 36 comprises an image memory of a memory device 24 mounted on an extension plate. The image memory 24 has a memory capacity for memorizing the pickup image signal of a single frame sent from the CCD video camera 22.

Herein, a principle of the present invention will be described in detail with reference to FIG. 1.

Figure 3:
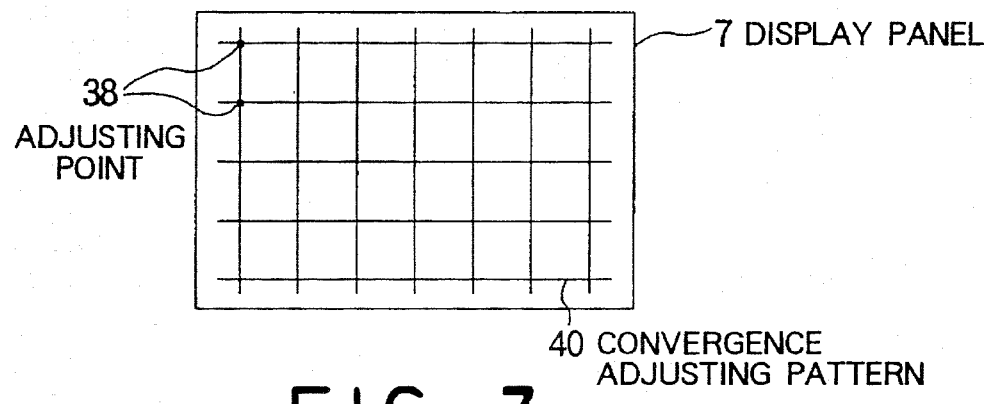
FIG. 3 shows an example of a convergence adjusting pattern which is projected as a projected image onto a display screen from a picture tube by controlling the convergence error detecting apparatus illustrated in FIG. 1.
Figure 4:
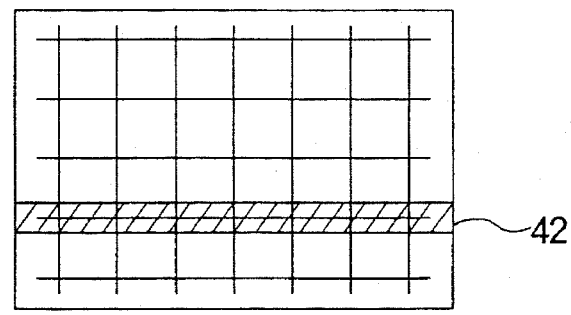
FIG. 4 exemplifies an objectionable image which might appear due to a difference of synchronization frequencies between a pickup image and the projected image.

At first, the convergence adjusting pattern 40 having a lattice shape, as illustrated in FIG. 3, is projected onto the display panel 7 from the projection-type display apparatus 10 under control of the controlling unit 28. At each cross point (will be called an adjusting point 38) in the convergence adjusting pattern 40, a projected point of each of the R, the G, and the B projectors 2, 3, and 4 is detected by obtaining a brightness distribution on a whole area of the display panel 7. Further, a detected position of each projected point is processed by the processing unit 26 to acquire the above-mentioned convergence error information. Thus, according to the present invention, the brightness distribution should correctly be calculated in respect of the whole area of the display panel 7.

In the present invention, the image pickup device 22 serves to obtain such a brightness distribution. Moreover, it is to be noted that the illustrated image pickup device 22 is driven by a synchronization signal of a pickup image signal which is not synchronized with a synchronization signal of a projected image signal displayed on the projection-type display system. Specifically, scanning frequencies between the pickup image signal and the projected image signal are different from each other. When such a difference is present between the pickup and the projected image signals, the following problem is caused to occur.

Due to characteristics of luminescent afterglow of each of the picture projection tubes 2, 3, and 4 and a storage time in a picture element of the image pickup device 22, a belt-shaped region in which the brightness distribution is not correctly obtained appears in a part of the memory device 24. The belt-shaped region is depicted by a shaded portion 42 in FIG. 4, and exhibits brightness extremely higher or lower than that of the remaining part of the pickup image signal. When an output image detected by the image pickup device 22 is monitored, such a belt-shaped region moves in a vertical direction. In addition, the width and the brightness of the belt-shaped region depends on a difference of the scanning frequencies between the pickup image signal and the projected image signal.

A method of solving this problem will be described hereinunder.

At first, rough prediction is made about the brightness distribution which appears in connection with the adjusting points on the memory device 24. When the aforesaid belt-shaped region is produced near the predicted portion, the brightness distribution only around the predicted portion is fetched again into the memory device 24 to obtain correct brightness distribution on the whole area of the display panel 7. Such prediction becomes possible by dividing the memory device 24 into a plurality of predetermined sections on the basis of each of the adjusting points 38.

Referring to FIG. 3 again, the description in turn proceeds to a method of dividing the memory device 24 into the predetermined sections.

Figure 2:
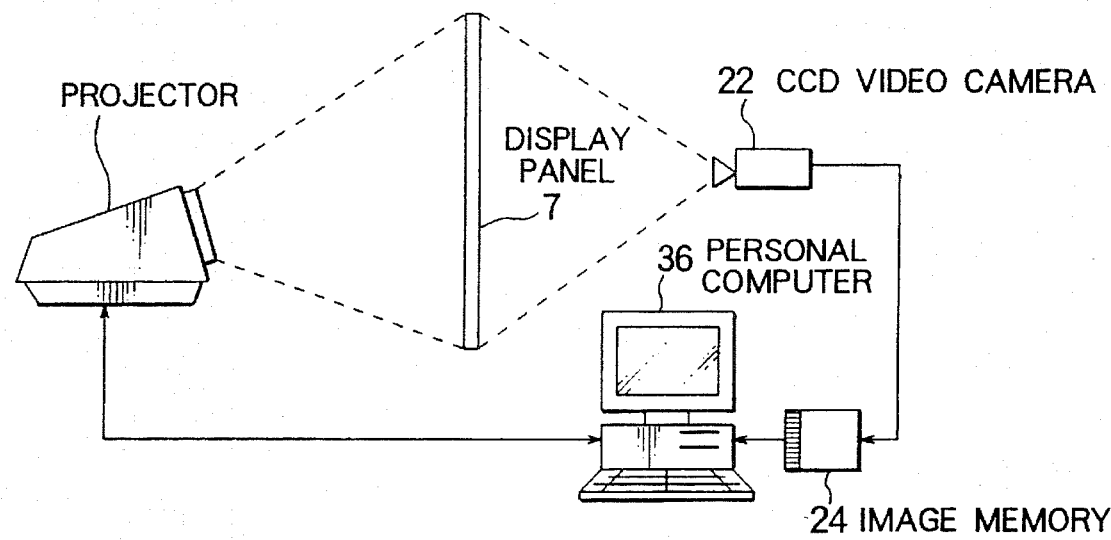
FIG. 2 schematically shows the convergence error detecting apparatus illustrated in FIG. 1.

At first, the convergence adjusting pattern 40 illustrated in FIG. 3 is projected on the display panel 7 from the projection-type display apparatus 10 under control of the controlling unit 28. The convergence adjusting pattern 40 is picked up in the form of the pickup image signal by the image pickup device 22 which is positioned to pick up a whole area of the display panel 7. Output detection signals which result from the convergence adjusting pattern 40 are then produced from the image pickup device 22 and are memorized into the memory device 24 which has a memory capacity for storing a single frame. The output detection signals are representative of the brightness distribution of the convergence adjusting pattern 40 displayed on the display panel 7. The output detection signals of the single frame are processed as primary projection data by the processing unit 26 which may be the personal computer 36, as illustrated in FIG. 2. Such processing may be called primary data projection processing. In any event, the processing unit 26 carries out the primary data projection processing in accordance with Equations (1) through (4) represented by:

$$Huh(n) = \sum_{m=1}^{Nv/2} H(n,m) \quad (n = 1 \text{ to } Nh), \quad (1)$$

$$Hdh(n) = \sum_{m=Nv/2}^{Nv} H(n,m) \quad (n = 1 \text{ to } Nh), \quad (2)$$

$$HLv(m) = \sum_{n=1}^{Nh/2} H(n,m) \quad (m = 1 \text{ to } Nh), \text{ and} \quad (3)$$

$$HRv(m) = \sum_{n=Nh/2}^{Nh} H(n,m) \quad (m = 1 \text{ to } Nh), \quad (4)$$

where Huh(n) and Hdh(n) represent an upper half and a lower half of the primary projection data located in a horizontal direction of the memory device 24 while HLv(m) and HRv(m) represent a lefthand side half and a righthand side half of the primary projection data located in a vertical direction of the memory device 24, and where H(n, m), n, m, Nh, Nv represent a brightness data signal, a horizontal address of the memory device 24, a vertical address of the memory device 24, the number of the primary projection data arranged in a horizontal direction, and the number of the primary projection data arranged in a vertical direction, respectively.

Figure 5:
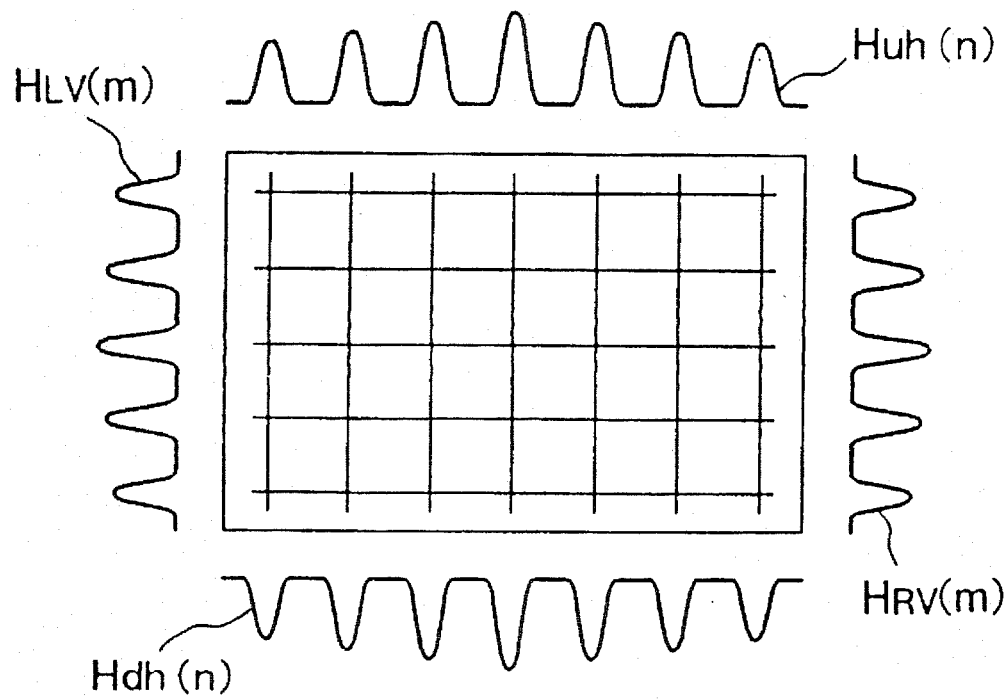
FIG. 5 shows a relationship between primary projection data and the projected image.

As a result of the primary data projection processing, four types of the primary projection data Huh(n), Hdh(n), HRv(m), and HLv(m) are obtained, as illustrated in FIG. 5. A threshold level, as illustrated in FIG. 6, is determined for each of the four types of the primary projection data, although only the above-mentioned Huh(n) and a threshold level Hus are exemplified in FIG. 6.

Figure 6:
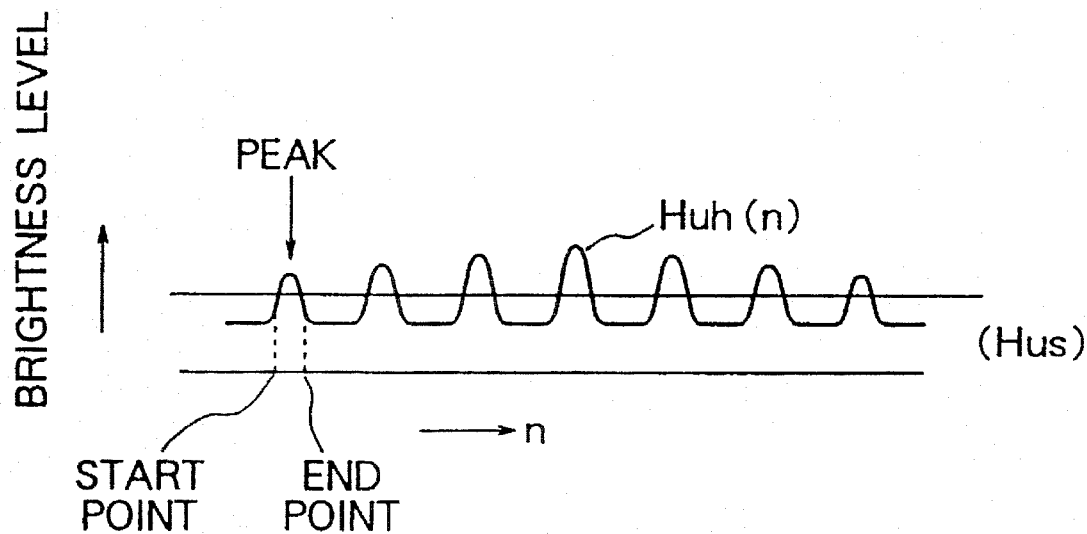
FIG. 6 shows a relationship between one of the primary projection data and a threshold level signal.

As is understood from FIG. 6, a start point is defined by a position in which the Huh(n) exceeds the threshold level Hus while an end point is defined by the other position in which the Huh(n) becomes smaller than the threshold level Hus.

Let each intermediate point between the start and the end points be defined by peak points in each of the primary projection data.

As regards the primary projection data arranged in the horizontal direction, the number of the peak points is equal to that of the adjusting points produced in the horizontal direction by the convergence adjusting unit 5.

Figure 7:
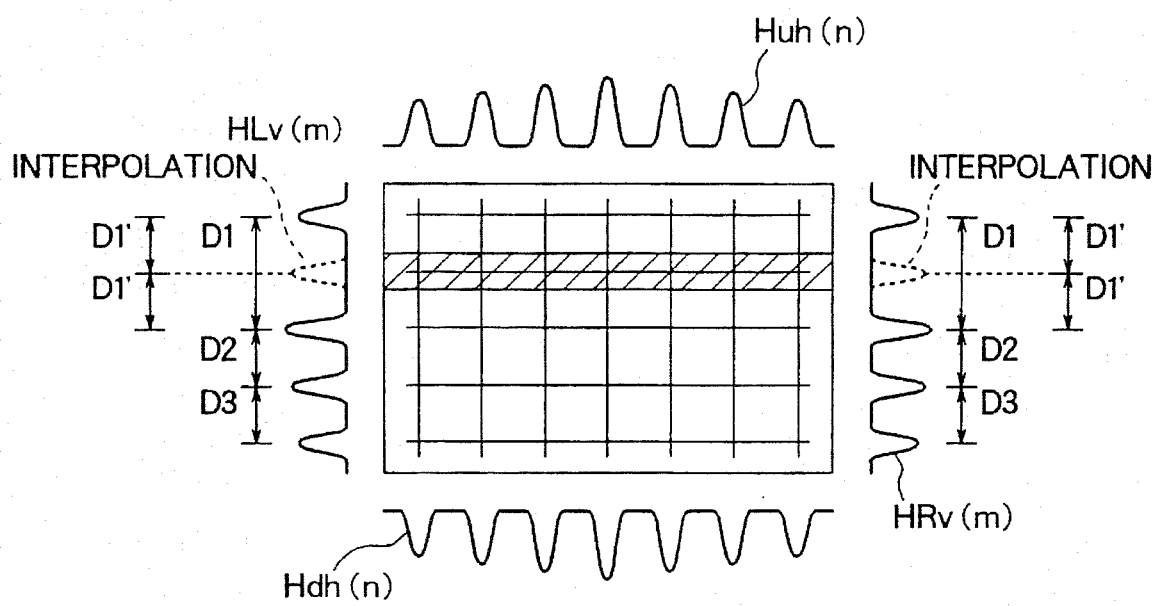
FIG. 7 shows a relationship between the primary projection data and an objectionable image.

As regards the primary projection data arranged in the vertical direction, the number of the peak points has to be equal to that of adjusting points produced in the vertical direction by the convergence adjusting unit 5. However, the primary projection data arranged in the vertical direction of the memory device 24 may include incorrect peak points or may not include correct peak points because of the presence of the aforesaid belt-shaped region, as suggested in FIG. 7. In FIG. 7, correct peak points are extinguished from the HLv(m) and HRv(m). In order to detect extinction of the correct peak points or appearance of the incorrect peak points, each space or each distance D1-D3 between the adjacent peak points may be investigated in connection with the primary projection data arranged in the vertical direction of the memory device 24. Such a space or distance D1-D3 between the adjacent peak points can be calculated by the processing unit 26. An average distance of the distances except a maximum distance is determined and is compared with a detected distance. As a result of comparison, let the detected distance be equal to predetermined times the determined average. In this event, interpolation is carried out so as to insert an additional peak point at every average distance between the adjacent peak points. Such an additional peak point will be referred to as an interpolated peak point.

Figure 8A:
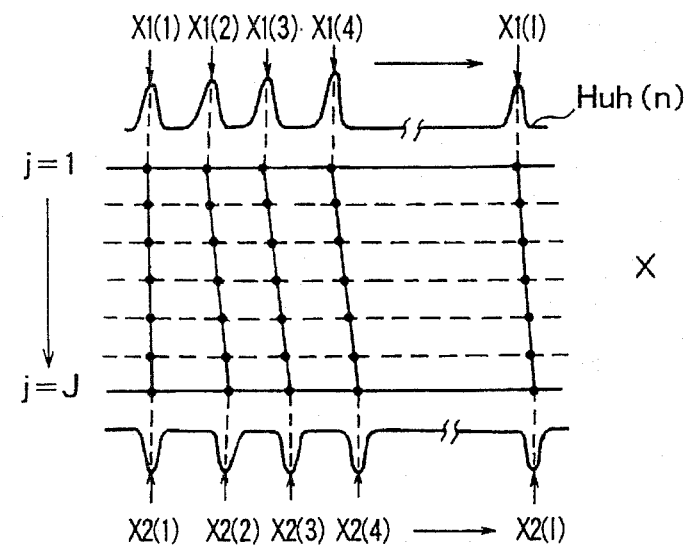
FIGS. 8(A) and 8(B) are views for use in describing operations carried out to process the primary projection data.
Figure 8B:
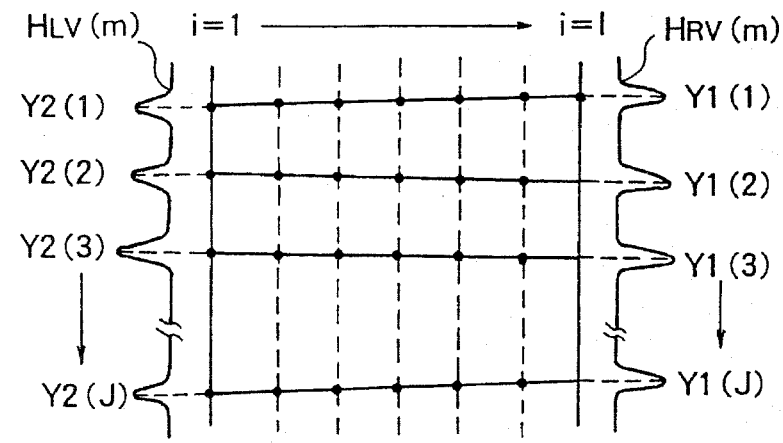
Figure 9:
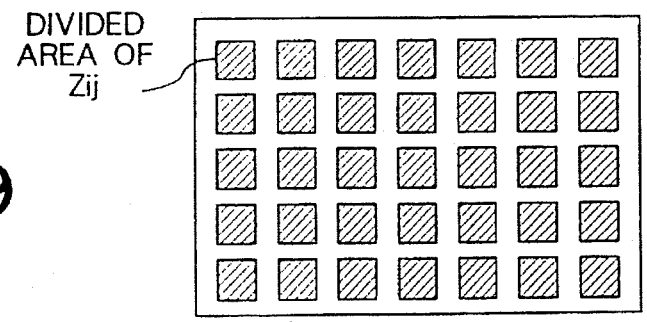
FIG. 9 is a view for use in describing another operation carried out to process the primary projection data.

Next, opposite peak points including the interpolated peak points are connected to each other by the use of computed horizontal and vertical lines, as illustrated in FIGS. 8(A) and 8(B). The computed horizontal and vertical lines intersect one another at crosspoints, as readily understood from FIGS. 8(A) and 8(B). Each crosspoint is used as a reference point for dividing the memory device 24 into predetermined areas. As a result, each of the reference points substantially coincides with each position of the memory device 24 at which a brightness distribution is extracted in connection with the adjusting points in the convergence adjusting unit 5.

Herein, the reference points are calculated by Equations (5), (6), and (7) given by:

$$Xij = \frac{(J-j) \cdot X1(i) + (j-1) \cdot X2(i)}{J-1}, \quad (5)$$

$$Yij = \frac{(I-i) \cdot Y2(j) + (i-1) \cdot Y1(j)}{I-1}, \text{ and} \quad (6)$$

$$Zij = (Xij, Yij), \quad (7)$$

where Xij and Yij represent an X address and a Y address assigned to the reference points of the memory device 24, respectively, while Zij indicates the reference point itself in the memory device 24, and where i (=1 to I), j (=1 to J), I, J, X1(i), X2(i), Y1(j), and Y2(j) represent positions of the adjusting points in the horizontal direction, positions of the adjusting points in the vertical direction, the number of the peak points in the horizontal direction, the number of the peak points in the vertical direction, X addresses of the peak points in the horizontal direction in the upper half of the memory device 24, X addresses of the peak points in the horizontal direction in the lower half of the memory device, Y addresses of the peak points in the vertical direction in the righthand (R) side half of the memory device, and Y addresses of the peak points in a vertical direction in lefthand side of the memory device, respectively.

Thus, the reference points are successively calculated by the processing unit 26 and the above-mentioned division of areas of the memory device 24 can be carried out to divide the memory device 24 into the predetermined areas. More particularly, when the convergence adjusting pattern is sent into the memory device 24 through the image pickup device 22, the brightness distribution at each adjusting point of the convergence adjusting unit 5 can be memorized in relation to each predetermined area of the memory device 24.

In this embodiment, each predetermined area of the memory device 24 is determined on the assumption that the relationships of positions between the projector 1 and the display panel 7 and between the display panel 7 and the image pickup device 22 are kept invariable. When the projector 1 is operable in response to various kinds of the scanning frequencies produced from signal sources, the memory device 24 may have a plurality of memory zones corresponding to the respective signal source. Alternatively, a plurality of the memory devices 24 may be prepared in correspondence to the signal sources.

Description will proceed to a method of obtaining the convergence error information in the convergence error detecting apparatus 20.

At first, a convergence adjusting pattern of a lattice-shape is projected onto the display panel 7 only from the green picture projection tube 3 under control of the controlling unit 28.

The convergence adjusting pattern projected on the display panel 7 is then picked up as the pickup image signal by the image pickup device 22 and is sent from the image pickup device 22 to the memory device 24 as the detection output signals. The detection output signals of the single frame are stored into the memory device 24.

Next, each area of the memory device 24 kept in the above-mentioned manner is read to be processed by the processing unit 26 in accordance with the following equations (8) and (9) given by:

$$Hhij(n) = \sum_{m=Yij-Yr}^{Yij+Yr} H(n,m) \quad (8)$$

$$(n = Xij - Xr \text{ to } Xij + Xr), \text{ and}$$

$$Hvij(n) = \sum_{n=Xij-Xr}^{Xij+Xr} H(n,m) \quad (9)$$

$$(m = Yij - Yr \text{ to } Yij + Yr).$$

where Hhij and Hvij represent primary projection data signals arranged in the horizontal direction and in the vertical direction, respectively, of the memory device 24 and where H(n,m), Xij, and Yij, represent brightness data signals, a horizontal address of the reference point in the memory device 24, and a vertical address of the reference point in the memory device 24, respectively, while Xr and Yr represent a horizontal range of each predetermined area and a vertical range of each predetermined area, respectively.

Figure 10:
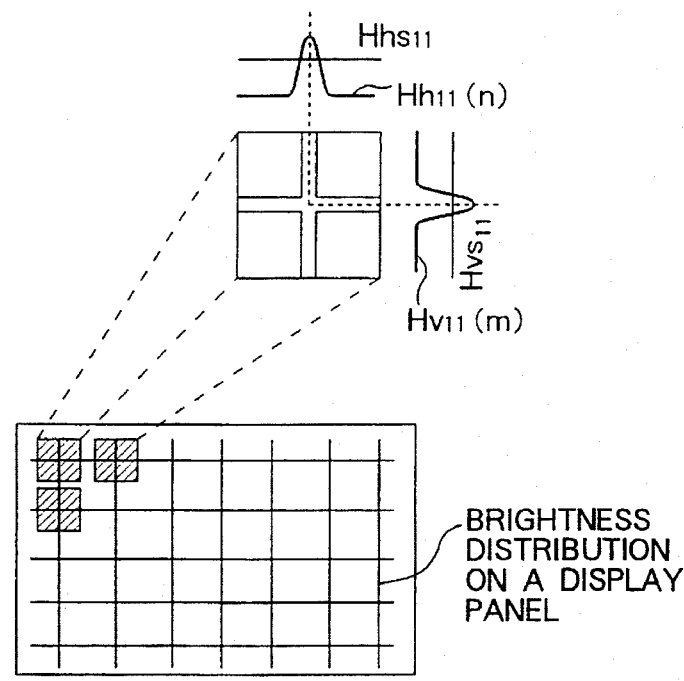
FIG. 10 shows a view for use in describing a further operation for processing the primary projection data.

First, by the use of the primary projection data obtained from the above primary projection data processing, a maximum value of the horizontal and the vertical primary projection data are retrieved at every one of the predetermined areas, as illustrated in FIG. 10. Each of horizontal and vertical threshold levels is determined at each area by the processing unit 26 on the basis of the maximum values. Next, an intermediate point is determined in each section which exceeds the horizontal or the vertical threshold level. An elongated line of each of the intermediate point is determined to have cross points mutually. Each cross point is decided to be a projected point by the green picture tube 3 at the adjusting point of the convergence adjusting unit 5. The projection point is decided in all of the areas of the memory device 24.

In the interim, the brightness distribution data signals in a certain area of the memory device 24 are assumed to be regarded as being influenced by the band-shaped portion, for example, when at least two intermediate points are obtained, when the maximum value is abnormally high or low, and the like. In such a case, only the brightness distribution data signal in the area is again fetched into the memory device 24.

The projection points of the green picture tube 3 decided in the above mentioned manner will be used as comparative values, when another convergence error information is extracted for the red and the blue picture tubes 2 and 4 in all the areas, as will be described hereinunder.

Second, the convergence error information is extracted for the red picture tube 2. To this end, a convergence adjusting pattern of a lattice-shaped is projected onto the display panel 7 only from the red picture projection tube 2 under control of the controlling unit 28.

Thereafter, some processes are conducted by the processing unit 26 in a manner similar to that of the green picture tube 3 to determine the projection points of the red picture tube 2 concerned with the adjusting point of the convergence adjusting unit 5.

Third, the convergence error information is produced as to the blue picture tube 4. For this purpose, a convergence adjusting pattern of a lattice shape is projected onto the display panel 7 by the use of the blue picture projection tube 4 alone under control of the controlling unit 28.

Thereafter, similar operations are executed by the processing unit 26 in a manner similar to those of the green and the red picture tubes 3 and 2 to determine the projected points of the blue picture tube 4 corresponding to the adjusting points of the convergence adjusting unit 5.

Each convergence error information for the red and the blue picture tubes 2 and 4 is acquired by calculating each difference between the projection points of the red or the blue picture tube 2 or 4 and those of the green picture tube 3. Each difference between the projection points is calculated by the processing unit 26 based on the following equations (10), (11), (12), and (13) given by:

$$Drhij = Xgij - Xrij \quad (10)$$

$$Dbhij = Xgij - Xbij \quad (11)$$

$$Drvij = Ygij - Yrij \quad (12)$$

$$Dbvij = Ygij - Ybij \quad (13)$$

where Drhij and Dbhij represent the differences concerned with the projection points of the red and the blue picture tubes 2 and 4 in the horizontal direction in each area, where Drvj and Dvvij represent the difference concerned with the projected points of the red and the blue picture tubes 2 and 4 in the vertical direction in each area. In addition, Xgij and Ygij represent horizontal and vertical addresses of the projection points of the green picture tube at the adjusting point, respectively. In addition, Xrij and Yrij represent the horizontal and the vertical addresses of the projection points of the red picture tube which correspond to the adjusting point, respectively, while Xbij and Ybij represent those horizontal and vertical addresses of the projection points of the blue picture tube which correspond to the adjusting points, respectively.

Each position specified by the calculated differences of the above-mentioned Drhij, Drvij, Dbhij, and Dbvij is coincident with each adjusting point of the convergence adjusting unit 5. Accordingly, a position data signal which is representative of the above-mentioned position can be transmitted from the controlling unit 28 to the convergence adjusting unit 5 as convergence error information for each adjusting point.

As mentioned above, the convergence error detecting apparatus according to the first embodiment can be applied to various projection-type display systems having various ports of scanning frequencies. Further, the convergence error detecting apparatus is compact in system. In addition, in the convergence error detecting apparatus, the image pickup device 22 can be driven by a synchronization signal which is not synchronized with the projected image signal projected onto the projection-type display system.

In the meantime, the convergence adjusting pattern mentioned in respect of the first embodiment has a lattice-shape, as illustrated in FIG. 3.

Figure 11:
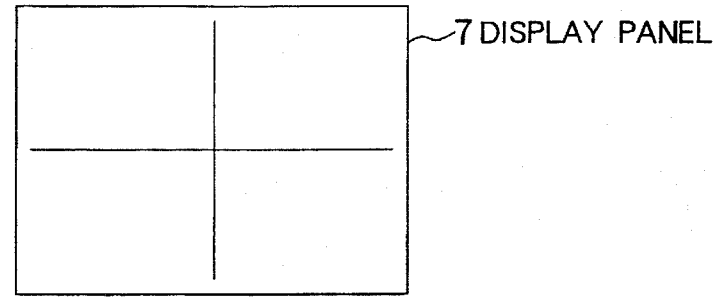
FIG. 11 shows an example of another convergence adjusting pattern which can be used in the convergence error detecting apparatus.

Alternatively, another convergence adjusting pattern of a crisscross, as illustrated in FIG. 11, may be projected on the display panel 7 under control of the controlling unit 28 and stored into the memory device 24. The illustrated pattern is formed by a horizontal line, namely, an X-line, and a vertical line, namely, a Y line perpendicular to the X-line.

In this case, a center area in the areas arranged in the X-Y crisscross is at first detected. The above-mentioned differences of Drhij, Drvij, Dbhij, and Dbvij are calculated from the center area, substituted into a function which may be, for example, a normalized orthogonal function, and processed by the processing unit 26. As a result, the convergence error information can be produced by the processing unit 26 and transmitted through the controlling unit 28 to the convergence adjusting unit 5. In this event, the convergence error information is calculated at each of eighteen waveform adjusting components which are provided in the convergence adjusting unit 5 and which are specified by combinations of a zeroth order component, a first order component (saw-toothed component), and a second order component (parabolic component) in each of the horizontal and the vertical directions.

Figure 13:
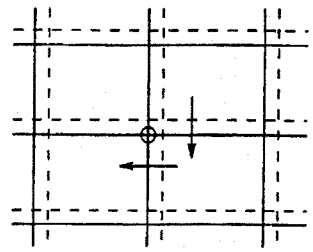
FIGS. 13(A) to 13(Q), drawn in two sheets, show waveform adjusting components provided in a convergence adjusting unit illustrated in FIG. 1.
Figure 13:
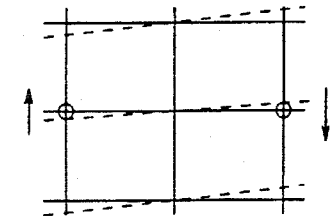
Figure 13:
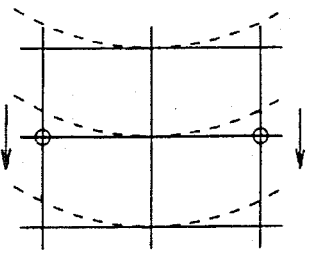
Figure 13:
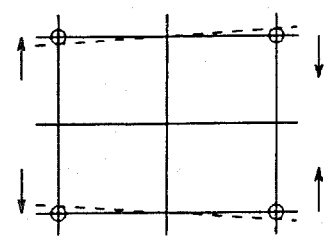
Figure 13:
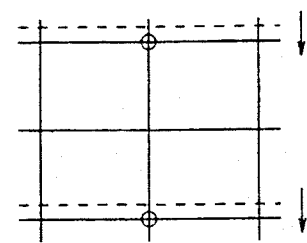
Figure 13J:
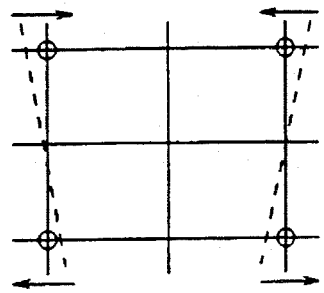
Figure 13K:
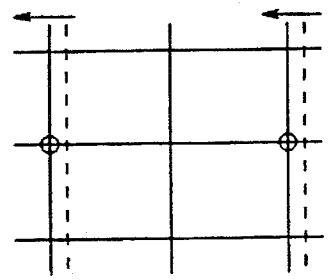
Figure 13I:
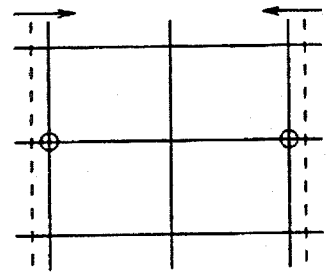
Figure 13M:
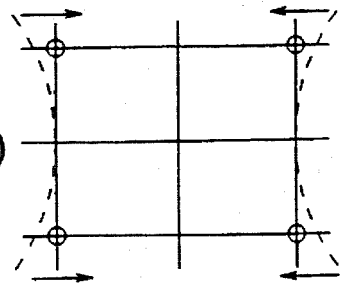
Figure 13N:
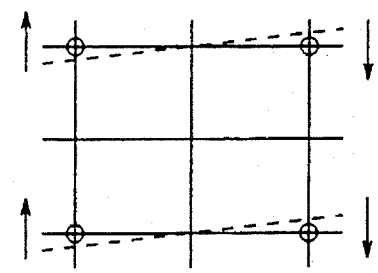
Figure 13O:
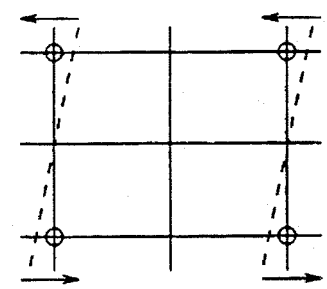
Figure 13P:
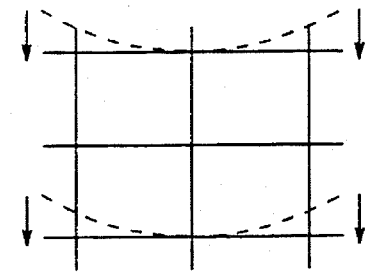
Figure 13Q:
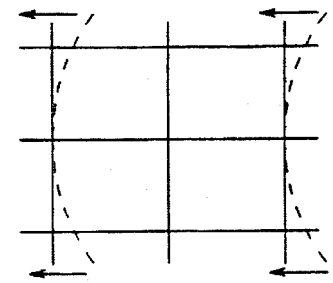
Figure 14A:
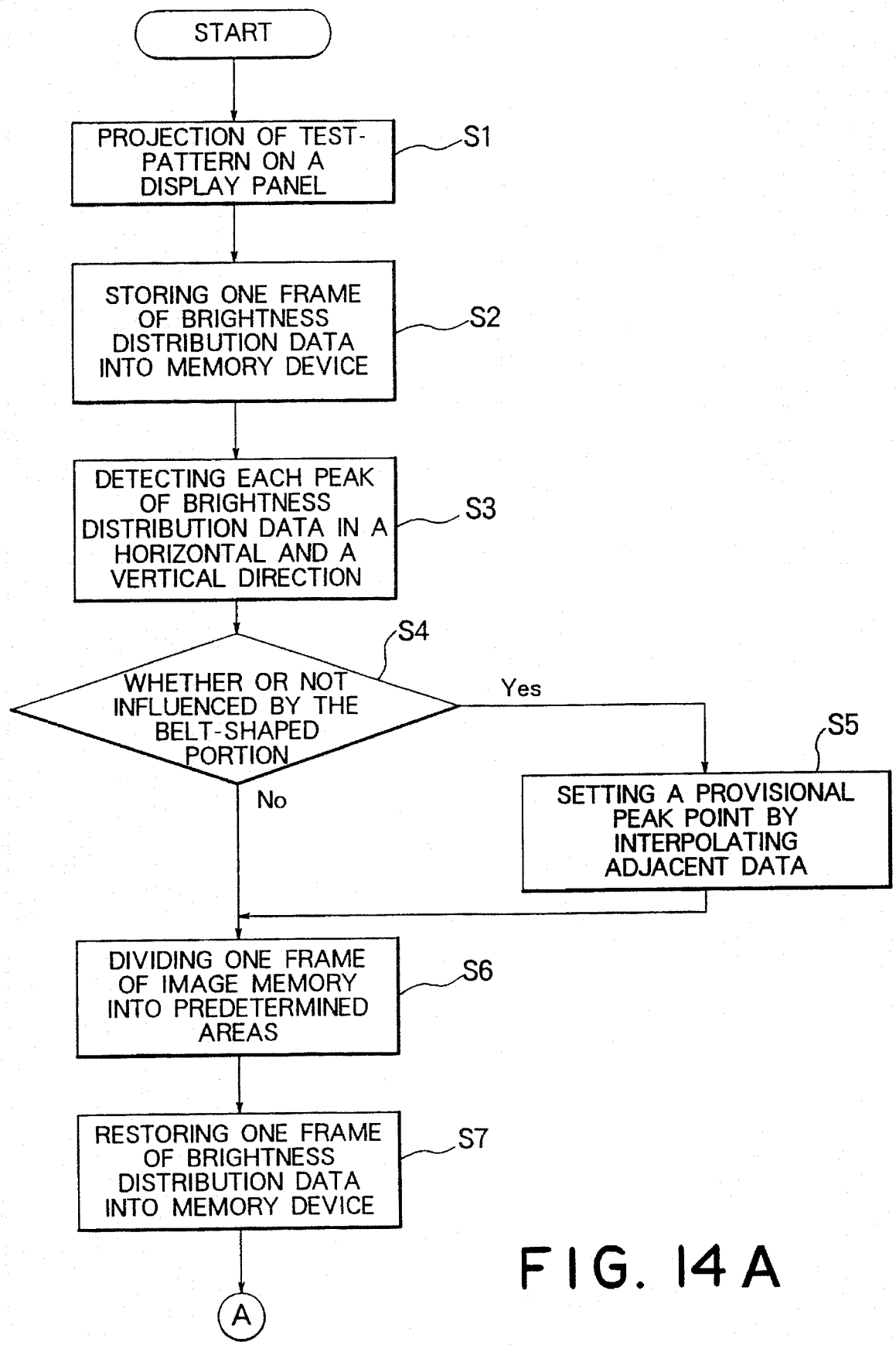
FIGS. 14(A) and 14(B), drawn in two sheets, are flow charts for illustrating an operation of the convergence error detecting apparatus illustrated in FIG. 1.
Figure 14B:
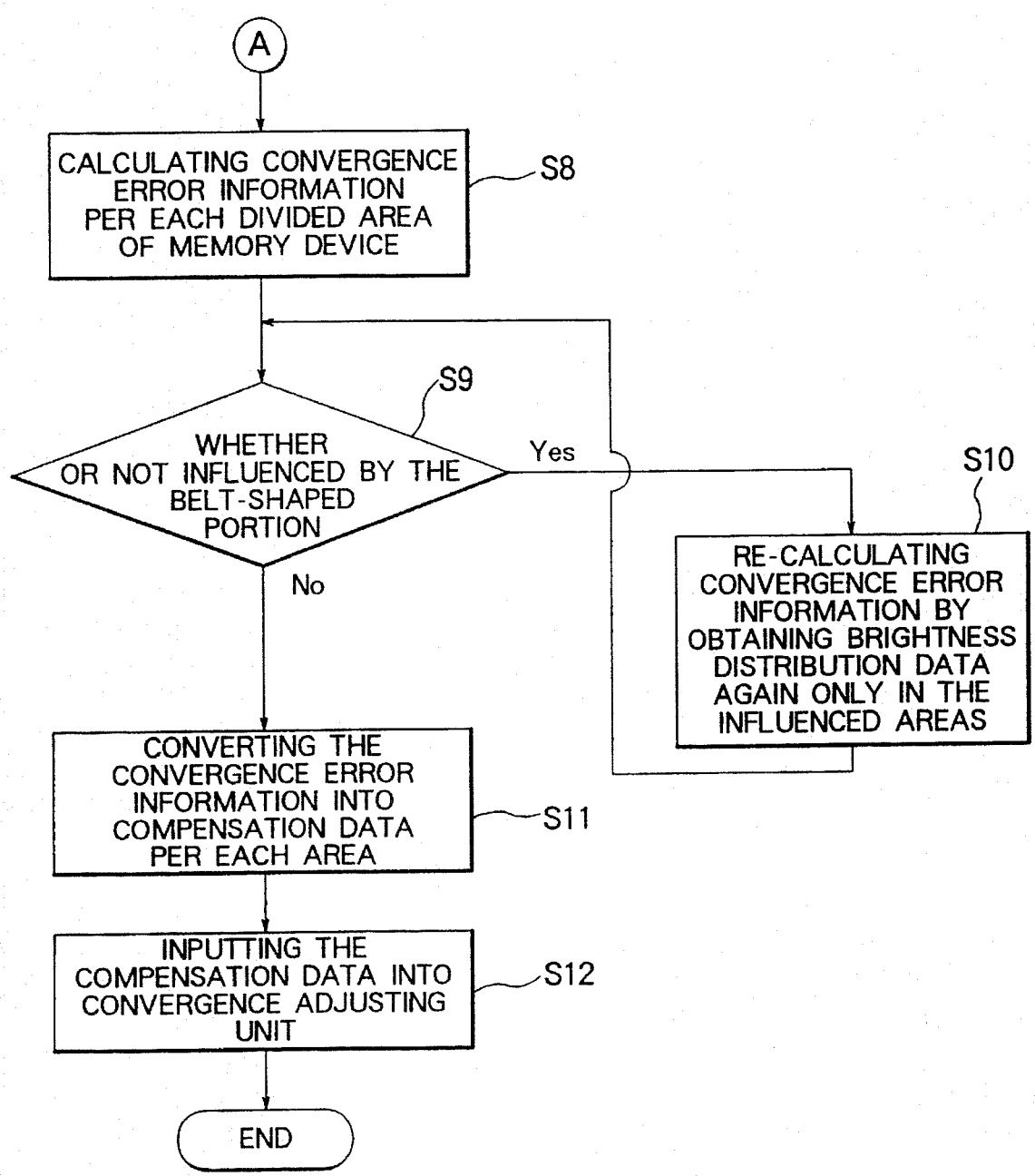

Referring now to FIGS. 13(A) to 13(Q), the adjusting components are exemplified for a better understanding of this invention.

In each of FIGS. 13(A) to 13(Q), a convergence adjusting pattern projected by the green picture tube 3 is shown as a reference pattern by solid lines while another convergence pattern depicted at broken lines shows a pattern to be adjusted and is projected by the red or the blue picture tube 2 or 4. In addition, each direction in which the convergence adjusting pattern should be adjusted is indicated by an arrow.

More specifically, FIG. 13(A) shows a convergence error state which results from static components appearing in horizontal and vertical directions when the convergence adjusting pattern is projected on the display panel 7. FIG. 13(B) shows a convergence error state which results from a tilt component (tilt distortion) appearing in a vertical direction. FIG. 13(C) shows a convergence error state which results from a bow component (bow-shaped distortion) appearing in a vertical direction. FIG. 13(D) shows a convergence error state which results from a keystone component (Keystone distortion) appearing in a vertical direction. FIG. 13(E) shows a convergence error state which results from a linear component (linear distortion) appearing in a vertical direction. FIG. 13(F) shows a convergence error state which results from a height component (amplitude distortion) appearing in a vertical direction. FIG. 13(G) shows a convergence error state which results from a pincushion component (pincushion distortion) appearing in a vertical direction. FIG. 13(H) shows a convergence error state which results from a skew component (skew distortion) appearing in a horizontal direction. FIG. 13(1) shows a convergence error state which results from a bow component (bow-shaped distortion) appearing in a horizontal direction. FIG. 13(J) shows a convergence error which results from a keystone component (keystone distortion) appearing in a horizontal direction. FIG. 13(K) shows a convergence error state which results from a linear component (linear distortion) appearing in a horizontal direction. FIG. 13(L) shows a convergence error state which results from a width component (amplitude distortion) appearing in a horizontal direction. FIG. 13(M) shows a convergence error state which results from a pincushion component (pincushion distortion) appearing in a horizontal direction. FIG. 13(N) shows a convergence error state which results from a keystone-balance component (keystone distortion) appearing in a vertical direction. FIG. 13(O) shows a convergence error state which results from a keystone-balance component (keystone distortion) appearing in a horizontal direction. FIG. 13(P) shows a convergence error state which results from a pincushion-balance component (pincushion distortion) appearing in a vertical direction. FIG. 13(Q) shows a convergence error state which results from a pincushion-balance component (pincushion distortion) appearing in a horizontal direction.

Figure 12:
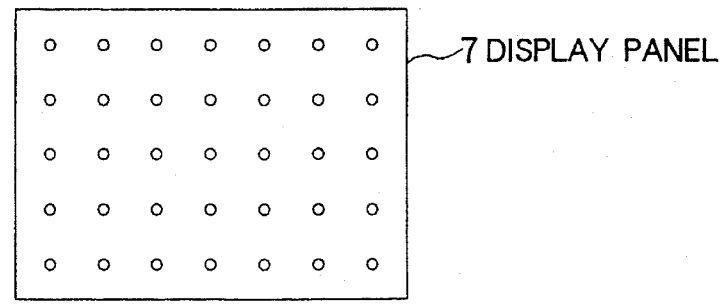
FIG. 12 shows still another example of a convergence adjusting pattern which is projected on a display panel from a picture tube by control unit of the convergence error detecting apparatus illustrated in FIG. 1.

While this invention has thus far been described in conjunction with several embodiments thereof, it will now be readily possible for one skilled in the art to put this invention into effect in various other manners. For example, the convergence adjusting patterns are not restricted to those illustrated in FIGS. 3 and 11. Namely, the convergence adjusting pattern may be such a pattern as illustrated in FIG. 12.

What is claimed is:

1. A convergence error detecting apparatus for use with a projection type display system which displays, onto a display panel, a projected image signal which has a first synchronization signal of a predetermined frequency, said apparatus for detecting a convergence error signal representative of a convergence error appearing on said projected image signal, said apparatus comprising:

image pickup means operated by a second synchronization signal of a frequency different from said predetermined frequency, for picking up said projected image signal to produce a pickup image signal by the use of said second synchronization signal;

processing means for processing said pickup image signal to detect said convergence error and to produce a convergence error signal representative of said convergence error; and means for providing said convergence error signal to said display system to correct said convergence error in said display system.

2. A convergence error detecting apparatus as claimed in claim 1, wherein said processing means is implemented by a computer.

3. A convergence error detecting apparatus as claimed in claim 1, wherein said processing means comprises:

a memory for memorizing said pickup image signal to produce a memorized image signal;

a processor unit coupled to said memory for calculating said convergence error in accordance with a predetermined algorithm; and a control unit coupled to said processor unit for producing said convergence error as said convergence error signal.

4. A convergence error detecting apparatus as claimed in claim 1, said display system comprising a controllable convergence adjusting unit for adjusting convergence of said projected image signal in response to a convergence control signal, wherein said convergence error signal is sent to said controllable convergence adjusting unit as said convergence control signal.

5. An image processing system comprising:

a display panel for displaying an image thereon;

a projector unit for projecting an image signal onto said display panel as a projected image signal to display said image on said display panel, said projected image signal having a first synchronization signal of a predetermined frequency;

a convergence error detecting apparatus for detecting a convergence error signal representative of a convergence error appearing on said projected image signal;

said convergence error detecting apparatus including:

image pickup means operated by a second synchronization signal of a frequency different from said predetermined frequency, for picking up said projected image signal to produce a pickup image signal by the use of said second synchronization signal;

processing means for processing said pickup image signal to direct said convergence error and to produce a convergence error signal representative of said convergence error;

means for supplying said convergence error signal to said projector unit to remove said convergence error in said projector unit.

6. An image processing system as claimed in claim 5, wherein said projector unit comprises:

first through third convergence controllable projectors for projecting, as said projected image signal, first through third color image signals onto said display panel, respectively;

a convergence adjusting unit supplied with said convergence error signal and coupled to said first through said third convergence controllable projectors for adjusting said convergence error in response to said convergence error signal.

7. An image processing system as claimed in claim 6, wherein said projector unit further comprises:

a convergence adjusting pattern generator for supplying said first through said third convergence controllable projectors with a predetermined number of convergence adjusting patterns.

8. An image processing system as claimed in claim 7, wherein said convergence error signal is detected by projecting a selected one of said convergence patterns onto said display panel by the use of a selected one of said first through said third convergence controllable projectors, by thereafter projecting said selected one of the convergence adjusting patterns by the remaining ones of the first through the third convergence controllable projectors, and by monitoring a brightness distribution of said pickup image signal.

9. A method of processing a pickup image signal to detect a convergence error and to produce a convergence error signal representative of said convergence error, said method comprising the steps of:

dividing a memory device into a plurality of predetermined sections on a basis of adjusting points at positions on said memory device;

making estimated predictions about a brightness distribution which appears in connection with said adjusting points on said memory device; and fetching said brightness distribution predictions from said memory device to obtain a correct brightness distribution for an entire area of a display panel.

10. A method for use in combination with a convergence error detecting apparatus as claimed in claim 1, said method for processing said pickup image signal to detect said convergence error and to produce said convergence error signal representative of said convergence error, comprising the steps of:

dividing a memory device into a plurality of predetermined sections on a basis of adjusting points on said memory device;

making estimated predictions about a brightness distribution which appears in connection with said adjusting points on said memory device; and fetching said brightness distribution predictions from said memory device to obtain correct brightness distribution on an entire area of a display panel.

11. A method as claimed in claim 9, wherein said dividing step comprises:

projecting a convergence adjusting pattern on said display panel from a projection-type display apparatus under control of a controlling unit;

sensing said convergence adjusting pattern in the form of the pickup image signal by the image pickup device which is positioned to sense an entire area of said display panel;

producing output detection signals resulting from said convergence adjusting pattern from the image pickup device;

memorizing said output detection signals in said memory device which has a memory capacity for storing a single frame;

carrying out primary data projection processing in accordance with predetermined equations to obtain four types of primary projection data;

determining a threshold level for each of the four types of said primary projection data;

defining each intermediate point between the start and the end points by peak points in each of said primary projection data;

investigating each space between adjacent peak points in connection with said primary projection data arranged in the vertical direction of the memory device;

determining an average distance of the distances between adjacent peak points except a maximum distance and comparing said average distance with a detected distance;

equalizing the detected distance to the determined average;

carrying out interpolation so as to insert an additional peak point at every average distance between the adjacent peak points;

connecting opposite peak points including the interpolated peak points to each other by the use of computed horizontal and vertical lines;

intersecting said computed horizontal and vertical lines at crosspoints; and using each of said crosspoints as a reference point for dividing the memory device into predetermined areas.

12. A method for use in combination with a convergence error detecting apparatus as claimed in claim 1, said method for obtaining the convergence error signal in said convergence error detecting apparatus, comprising:

projecting a convergence adjusting pattern of a lattice-shape onto the display panel only from a green picture projection tube under control of a controlling unit;

picking up the convergence adjusting pattern projected on the display panel as the pickup image signal by the image pickup device and sending the pickup image signal from the image pickup device to a memory device as detection output signals;

storing the detection output signals of a single frame into the memory device;

reading and processing each area of the memory device by the processing means in accordance with predetermined equations;

retrieving a maximum value of a horizontal and a vertical primary projection data at predetermined areas;

determining each of horizontal and vertical threshold levels at each area by the processing means on the basis of the maximum values;

determining an intermediate point in each section which exceeds the horizontal or the vertical threshold level;

determining an elongated line of each of the intermediate points to have mutual cross points;

deciding each cross point to be a projected point by green, red or blue picture tubes at an adjusting point of a convergence adjusting unit;

deciding the projection point in the memory device; and using the projection points of the green picture tube as comparative values when other convergence error signal is extracted for the red and the blue picture tubes in all the areas of the memory device.

13. An apparatus for detecting a convergence error from a pickup image signal and for producing a convergence error signal representative of said convergence error, said apparatus comprising:

a memory device divided into a plurality of predetermined sections on a basis of adjusting points at positions on said memory device;

means for making estimated predictions about a brightness distribution which appears in connection with said adjusting points on said memory device; and means for fetching said brightness distribution predictions from said memory device to obtain a correct brightness distribution for an entire area of a display panel.

14. The apparatus of claim 13, further comprising:

means for projecting a convergence adjusting pattern on said display panel from a projection-type display apparatus under control of a controlling unit;

an image pickup device positioned to sense an entire area of said display panel and sense therefrom said convergence adjusting pattern in the form of the pickup image signals;

means for producing output detection signals resulting from said convergence adjusting pattern from the image pickup device;

said memory device memorizing said output detection signals and said memory device having a memory capacity for storing a single frame;

means for carrying out primary data projection processing in accordance with predetermined equations to obtain four types of primary projection data;

means for determining a threshold level for each of the four types of said primary projection data;

means for defining each intermediate point between a start and an end points by peak points in each of said primary projection data;

means for investigating each space between adjacent peak points in connection with said primary projection data arranged in the vertical direction of the memory device;

means for determining an average distance of the distances between adjacent peak points except a maximum distance and comparing said average distance with a detected distance;

means for equalizing the detected distance to the determined average;

means for carrying out interpolation so as to insert an additional peak point at every average distance between the adjacent peak points;

means for connecting opposite peak points including the interpolated peak points to each other by the use of computed horizontal and vertical lines;

means for intersecting said computed horizontal and vertical lines at crosspoints; and said memory device divided into predetermined areas by using each of said crosspoints as a reference point.

15. A convergence error detecting apparatus as claimed in claim 1, for processing said pickup image signal to detect said convergence error and to produce said convergence error signal representative of said convergence error, said convergence error detecting apparatus further comprising:

a memory device divided into a plurality of predetermined sections on a basis of adjusting points on said memory device;

means for making estimated predictions about a brightness distribution which appears in connection with said adjusting points on said memory device; and means for fetching said brightness distribution predictions from said memory device to obtain a correct brightness distribution for an entire area of a display panel.

16. A convergence error detecting apparatus as claimed in claim 1, further comprising:

means for projecting a convergence adjusting pattern of a lattice-shape onto the display panel only from a green picture projection tube under control of a controlling unit;

said image pickup means for sensing the convergence adjusting pattern projected on the display panel as the pickup image signal;

a memory device receiving the pickup image signal from the image pickup means as detection output signals, said memory device storing the detection output signals as a single frame;

said processing means reading and processing each area of the memory device in accordance with predetermined equations;

means for retrieving a maximum value of horizontal and vertical primary projection data at predetermined areas of said memory device;

said processing means determining each of horizontal and vertical threshold levels at each area on the basis of the maximum values;

means for determining an intermediate point in each section which exceeds the horizontal or the vertical threshold level;

means for determining an elongated line of each of the intermediate points to have mutual cross points;

means for deciding each cross point to be a projected point by green, red or blue picture tubes at an adjusting point of a convergence adjusting unit;

means for deciding the projection point in the memory device; and means for using the projection points of the green picture tube as comparative values when other convergence error information is extracted for the red and the blue picture tubes in all the areas of the memory device.

* * * * *